United States Patent

[11] 3,547,413

| [72] | Inventor | Erwin J. Nunlist<br>Penfield, N.Y. |
|---|---|---|
| [21] | Appl. No. | 772,899 |
| [22] | Filed | Nov. 4, 1968 |
| [45] | Patented | Dec. 15, 1970 |
| [73] | Assignee | Sybron Corporation<br>Rochester, N.Y.<br>a corporation of New York |

[54] MIXING APPARATUS
6 Claims, 2 Drawing Figs.

[52] U.S. Cl. .................................................. 259/108;
99/277.2
[51] Int. Cl. .................................................. B01f 7/16
[50] Field of Search ........................................ 259/107,
108, 5—8, 23, 24, 43, 44, 178; 99/277.2, 348

[56] References Cited
UNITED STATES PATENTS
1,621,277  3/1927  Richman ..................... 259/108

| 1,995,465 | 3/1935 | Bigelow ......................... | 259/108 |
| 2,553,582 | 5/1951 | Heller ............................ | 259/107 |
| 2,573,837 | 11/1951 | Fox .............................. | 259/108 |

Primary Examiner—Robert W. Jenkins
Attorney—Theodore B Roessel

ABSTRACT: An improved brewery mixing apparatus having elongated segmental agitator blades is disclosed. The blades are formed with at least one channel contained thereon to define a fluid movement path along which the mixture in the vessel may move outwardly in a controlled manner during mixing. The mixing apparatus is suitable for use in a cereal cooker as well as a mash mixer and is designed to move the ingredients over the jacketed areas of the mixer to obtain a maximum heat transfer rate and to avoid burn-ons while maintaining a low-shear in order to avoid disintegration of the particle size.

PATENTED DEC 15 1970

3,547,413

INVENTOR
ERWIN J. NUNLIST

BY
Theodore B. Roessel
ATTORNEY

MIXING APPARATUS

BACKGROUND OF THE INVENTION

This invention relates generally to a mixing apparatus and more particularly to a new and novel brewery mixing apparatus designed for use in mixing ingredients contained in cereal cookers and mash mixers.

An ideal mixing apparatus for the brewing process requires that the apparatus contain an agitator which has the following capabilities:

1. The ability to mix sufficiently in order to obtain uniform temperature and consistency of the mixture.
2. The ability to move the mash at relatively high velocities over the jacketed areas and avoiding burn-ons of the mixture on the vessel.
3. The ability to obtain the minimum amount of shear action on the mixture in order to avoid disintegration of the particle size of the mixture.

The particle size and general condition of the mash in the brewing process is very important since the mash grains are actually used as the filtering media. Therefore, when the mash is "beat up" by the agitator blades, a dense grain bed occurs which requires excessive leeching and straining times. The brewery mash is generally composed of about five (5) parts of water and two (2) parts of grain, the particles being ground to various sizes which are heavier than water.

Minimum agitation requirements in mixing dictate that the grain particles be kept in suspension and well-dispersed in the fluid to avoid concentrations of interlocked particles that become difficult to disperse. An effective agitator must of necessity be relatively large compared to the size of the vessel in order to obtain a large volume flow on the agitator blades at minimum pressure.

Prior art mixers generally utilized large radial arm agitator blades formed from cast steel. These blades were relatively narrow and were designed to sweep along the bottom of the vessel to give the mash a circumferential velocity. A mixer of this type is shown generally in the patent to W. Heller et al. U.S. Pat. No. 2,553,582 and generally required large horsepowers for operation as well as an excessive speed of the agitator blades in order to impart the adequate stirring action necessary for proper mixture to the entire mash.

Recent tests were conducted in order to find an improved agitator which would produce a rotary as well as a rolling motion in the mixture and one that would provide better agitation at slower speeds with less power than could be accomplished by prior art agitators. The slow-speed agitator was much preferred over the prior art devices since a slow-speed agitator has a less damaging effect on the malt than the high-speed agitators of the prior art.

In addition to the before-mentioned characteristics found desirable for better agitation of the mixture, it was felt that a new mixing apparatus also must be capable of being utilized in a cereal cooker as well as a mash mixer. In a cereal cooker, the function of the agitator is to produce a uniform mixture of malt and unmalted adjunct with the water. Since the most difficult agitation occurs immediately after the material has been added and the grits are considerably heavier than water, they must be kept in suspension with a uniform temperature throughout the entire mixture. To accomplish this, a large flow and a frequent turnover of the mash is required while maintaining the velocity at a minimum by using large agitator blades running at slow speeds. This type of agitation is most desirable to promote a dissolving action of the protein and liquifying the boiled starch in the mixture.

When used in a mash mixer, a similar condition exists except that the settling of the malt does not occur as fast as with the cereal cooker. Therefore, the agitation must be as gentle as possible to prevent any breakdown of the ground malt into fines which may be detrimental to the lautering process.

SUMMARY OF THE INVENTION

The present invention overcomes the difficulty and limitations found in the prior art mixers by providing an improved mixing apparatus comprising a plurality of elongated segmental agitator blades having fluid movement paths formed thereon. The segmental blades, combined with other improvements hereinafter described, provide a new and novel mixing apparatus which is capable of inducing tangential and radial movement of the mixture along the movement paths to impart a rolling and swirling action to the mixture to cause the ingredients to be mixed in an improved controlled manner.

Accordingly, it is an object of the invention to provide a new and novel mixing apparatus which provides a mixture having a uniform temperature and consistency.

Another object of the invention is to provide a new and novel mixing apparatus that is capable of moving the mash in the mixer at a relatively high velocity over the jacketed areas of the mixer thereby attaining a maximum heat transfer rate.

Still another object of the invention is to provide a new and novel mixing apparatus which is capable of mixing with minimum amounts of shear action on the mixture thereby avoiding disintegration of the particles in the mixer.

Yet another object of this invention is to provide a new and novel mixing apparatus which provides proper mixtures by inducing tangential and radial movement of the mixture along fluid movement paths formed on the agitators to impart a rolling and swirling action to the mixture.

Still another object of this invention is to provide a new and novel mixing apparatus that is suitable for use in a cereal cooker as well as a mash mixer.

Another object of this invention is to provide a new and novel mixing apparatus having stronger agitator blades with sufficient stiffness to avoid bending of the blades from liquid pressure exerted on the outer surface thereof.

Yet another object of the invention is to provide a new and novel mixing apparatus having a plurality of segmental agitator blades containing at least one channel formed thereon to define fluid movement paths along which the mixture may travel outwardly in a controlled manner.

These and other objects and advantages of the invention will become more apparent from a study of the attached drawing and from a reading of the description of the preferred embodiment.

DESCRIPTION OF THE PREFERRED EMBODIMENT

Figure 1:
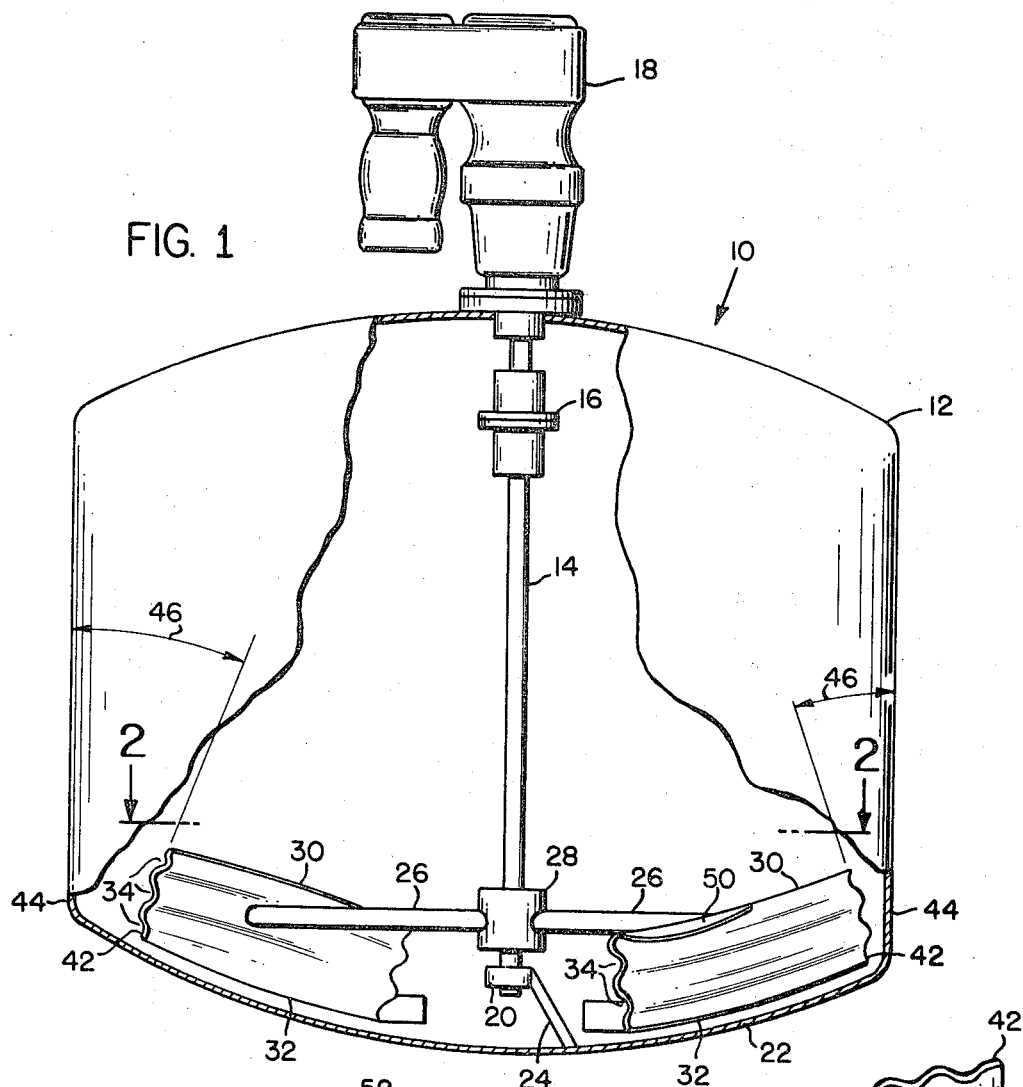
FIG. 1 is an elevational view, partially in section, showing the improved mixing apparatus of the invention.

Referring particularly to FIG. 1, there is shown generally at 10, the mixing apparatus of the invention and comprises a vessel 12 containing the ingredients to be mixed. Located in the central portion of the vessel 12 is a rotatable vertical, driving shaft 14, connected by means of a coupling 16 to an externally mounted motor 18. The lower portion of the driving shaft 14 is journaled in the bearing 20 which is rigidly fixed to the bottom of the vessel 22 by means of the bracket 24.

Mounted on the lower portion of the driving shaft 14 is a plurality of substantially horizontal agitator arms 26 which are rigidly fastened to the driving shaft 14 by means of the hub 28. Contained on the agitator arms 26 are a plurality of elongated segmental agitator blades 30 which are rigidly fastened to the outer portions of the arms 26 in such a manner that the lower edges 32 of the agitator blades 30 are located substantially parallel with the bottom of the vessel 22.

The agitator blades 30 have formed thereon at least one channel 34 which serves to define a fluid movement path along which the mixture travels outwardly during the rotation of the segmental blades 30. In the embodiment shown in FIG.

Figure 2:
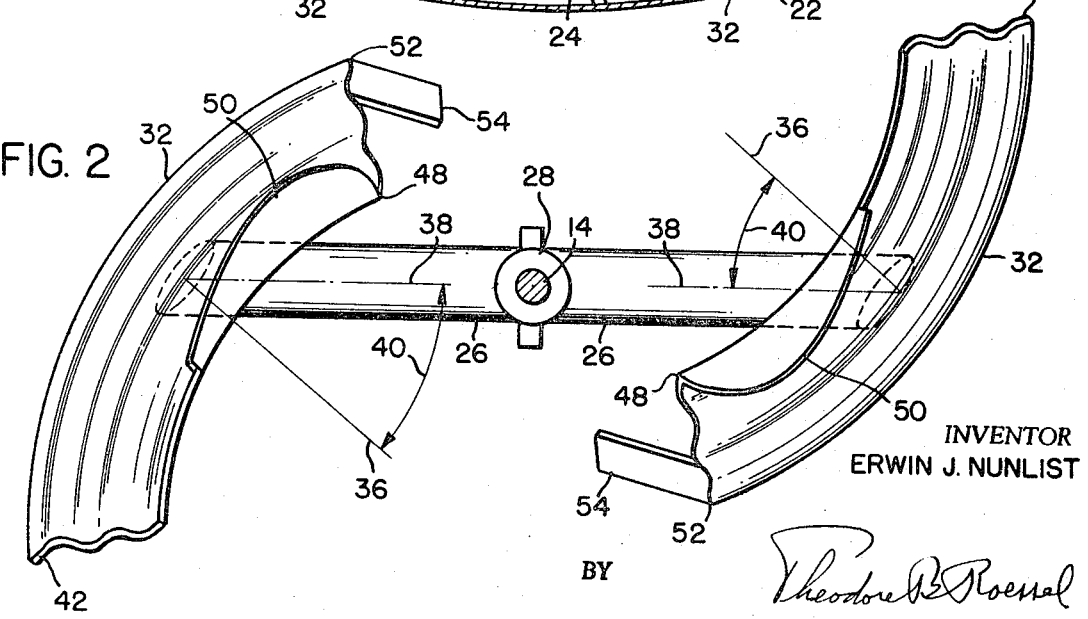
FIG. 2 is a sectional view taken along line 2–2 of FIG. 1 showing the segmental agitator blades of the invention.

1, the agitator blades 30 have been formed of corrugated stainless steel thereby utilizing several fluid movement paths over which the mixture may travel. By the use of the corrugated cross section as illustrated in FIGS. 1 and 2, the thickness of the segmental agitator blades 30 may be reduced to less than one-half of a standard blade thickness while still retaining sufficient structural strength to avoid bending of the blade whenever liquid pressure on the outer surface of the blades is at a maximum during operation of the mixer. The use of the corrugated blade 30 results in improved channeling of the mixture outwardly so that the mash is moved along the full length of the blade from the leading to the trailing edge during rotation.

The width of the blade and the number of channels 34 formed thereon is determined by the size of the vessel 12 and the consistency of the mixture to be agitated. As the diameter of the vessel increases, it is preferred that a wider blade be used since a narrower, prior art-type blade, produces lumps of grain resulting from water being squeezed out from between the grains in front of the agitator blades during rotation. With a narrower, prior art-type blade, while the grains are moving outwardly along the blade, the water tends to drain out from the central portion of the particle mass. In distinction, with the use of a wide blade, a core of the original composition will remain and travel along the blade during rotation since there is not enough time for the water to drain the distance of the wide blade.

Referring now particularly to FIG. 2, there is shown a sectional view of the improved apparatus taken along line 2–2 of FIG. 1. The segmental agitator blades 30 are positioned on the agitator arms 26 so that the radius of curvature 36 of the blades 30 is angularly displaced from the axis 38 of the agitator arms 26 by the angle shown as 40 in the drawing. With an angular displacement of the blades, 30, a helical or spiral configuration is achieved having constant pitch to induce a constant radial acceleration of the liquid outwardly along the blade during rotation. The radial acceleration results from a constantly increasingly radial velocity proportional to the distance from the center of the shaft 14.

Since a helical or spiral blade configuration is difficult and expensive to produce, the segmental blade construction of the invention is preferred having the angular displacement 40, as shown in FIG. 2, having an average radius of a theoretical spiral. The helix angle 40 of the segmental blades 30 has been found from experimentation to be between 25 and 30 degrees whenever the mixer contains water and from 35 to 40 degrees when the mixer contains mash. However, since there are many other variable involved in the design of the improved mixing apparatus, these angles are not to be construed as limiting the spirit and scope of the invention.

In order to prevent packing and lumping of grains along the lower wall 44 of the vessel 12, the agitator blades 30 are tilted at the angle 46 in relation to the vertical side of the vessel 12. The angle 46 is also dependent upon many factors in the design of a proper agitator blade with 15 degrees being found satisfactory. When the improved mixing apparatus is used in a concaved bottom vessel, as shown in FIG. 1, the trailing edges 42 of the segmental blades 30 are naturally displaced from the lower wall of the vessel 44 by the amount of angle 46.

The use of the tilt angle 46 also serves as a means for directing the outwardly moving mixture upwardly in the vessel 12 whenever the blades 30 are rotated by the motor 18. Since the segmental blades 30 are offset from the axis 38 of the arms 26, the combination of the tangential and radial movement of the mixture along the channels 34 combine with the means for directing the mixture upwardly resulting from the angle 46 to induce a rolling and swirling action to the mixture. This action causes the ingredients to be mixed in an improved, controlled manner, which has been heretofor unobtainable with prior art devices.

Formed on the upper leading edges 48 of the segmental blades 30 is an outwardly extending substantially horizontal, planar member 50 which serves to channel the flow of mash at the leading edge 48 during rotation thereby preventing the mash from spilling over the top edges of the blades 30 thereby improving the mixing.

In a similar manner, the lower leading edge 52 of the segmental blades 30 contains an inwardly extending, substantially horizontal, plate member 54 which serves to sweep over the vessel drain to prevent gum-up of the mixture in the lower central portion of the vessel which is not swept by blades 30. The portion of the mixture that is swept by the plate member 54 passes into the path of the blades 30 and is accordingly projected outwardly as before mentioned.

In operation, the motor 18 rotates the segmental blades 30 in a slow, controlled manner to accomplish a gentle, uniform motion requiring low velocities with frequent turnovers of the mixture. The angularly displaced segmental blades having at least one channel formed thereon serve to impart a tangential and radial movement of the mixture along the channels, thereby directing the mixture outwardly in a controlled manner where it is then given a rolling and swirling action at the leading edge of the blades 30 by means of the tilt angle 46 determined by the position of the blades 30 in relation to the lower portion of the walls 44.

For mixing cereal mash, it has been found that running at optimum speeds, the improved mixer of the invention requires a speed of only about 57 percent of the prior art speeds with only approximately 39 percent of the power. When used in mixing malt mash, similar conditions existed with the improved mixer requiring only 57 percent of the prior art speeds and 70 percent of the power.

From the above, it is obvious that modifications then may be made to the apparatus without departing from the spirit and scope of the invention. For example, the improved mixer shown in FIGS. 1 and 2 has been described in the preferred embodiment to consist of two segmental blades 30. However, three or more agitator arms 26 and segmental blades 30 may be utilized depending upon the size of the vessel 12 and the consistency of the ingredients contained within the vessel.

In summary, there has been disclosed a new and novel improved mixing apparatus having large, slow running, agitator blades which accomplish a gentle, uniform motion by slow rotation with frequent "turnovers" of the mixture. When used in a mash mix of high viscosities, the improved apparatus of the invention allows relatively large amounts of material to be picked up by the agitator blades without depending on propogation of velocities within the mash. In comparison with prior art mixers generally producing only rotary motion of the mixture, the improved mixing apparatus of the invention combines rotary motion with a rolling motion, as before mentioned, at slower speeds and less power requirements.

From the foregoing, it will be seen that efficient and economical means have been provided for accomplishing all of the objects and advantages of the invention. Nevertheless, it is apparent that many changes in details of construction or arrangement of parts of the apparatus may be made without departing from the spirit and scope of the invention as expressed in the accompanying claims and the invention is not to be limited to the exact matters shown and described since only the preferred embodiment has been given by way of illustration only.

I claim:

1. In a brewery mixing apparatus of the type wherein a plurality of motor driven agitator blades are mounted on a rotatable, vertical driving shaft, within a vessel for agitating the mixture contained in the vessel, the improved mixing apparatus, comprising:

a. a plurality of substantially horizontal agitator arms mounted on the lower portion of the driving shaft; and b. a plurality of elongated, segmental agitator blades, having at least one channel formed thereon to define outwardly extending fluid movement paths therealong;

i. said blades being rigidly fastened to the outer portions of said arms so that the lower edges of said blades are substantially parallel with the bottom surface of the vessel;

ii. said blades being positioned on said arms so that the radius of curvature of said segmental blades is angularly displaced from the axis of said arms to induce tangential and radial movement of the mixture along said fluid movement paths; and iii. means, located at the lower portion of the vessel, for directing the outwardly moving mixture upwardly in the vessel, said directing means combining with said tangential and radial movement imparted to the mixture by said blades, to impart a rolling and swirling action to the mixture thereby causing the ingredients to be mixed in a controlled manner.

2. The improved mixing apparatus as defined in claim 1 further characterized by said blades having formed, on the upper leading edges thereof, an outwardly extending, substantially horizontal planar member.

3. The improved mixing apparatus as defined in claim 2 further characterized by said blades having formed on the lower leading portion thereof, an inwardly extending, substantially horizontal plate member, said plate member being positioned on said blades so that the leading portion of said plate member is located in front of the leading portion of said blades.

4. The mixer combination, comprising:
a. a vessel;
b. a drive shaft, vertically positioned in the central portion of said vessel;
c. a plurality of outwardly extending, substantially horizontal, agitator arms fixed in the lower portion of said drive shaft;
d. a plurality of corrugated segmental agitator blades, fixed to the outer ends of said agitator arms, for defining outwardly extending fluid movement paths therealong, the lower edges of said blades being substantially parallel with the bottom surface of said vessel and said blades being fixed on the outer ends of said arms in a manner whereby the radius of curvature of said blades is angularly displaced from the axis of said arms for inducing tangential and radial movement of the contents of the mixer along said fluid movement paths; and
e. means located at the lower portion for directing the outwardly moving contents of the mixer upwardly in said vessel, said directing means combining with said tangential and radial movement imparted to the contents of the mixture to impart a rolling and swirling action to the mixture, thereby causing the contents of the mixer to be mixed in a controlled manner.

5. The combination as defined in claim 4, further characterized by said corrugated blades having formed on the upper leading edges thereof an outwardly extending, substantially horizontal planar member.

6. The combination as defined in claim 5, further characterized by said corrugated blades having formed on the lower leading portion thereof, an inwardly extending, substantially horizontal plate member positioned so that the leading portion of said plate member is located in front of the leading portion of said corrugated blades.